United States Patent [19]

Freeman

[11] 4,219,301

[45] Aug. 26, 1980

[54] VERTICAL CONVEYOR

[76] Inventor: Burton R. Freeman, 917 Greenwood Rd., Plattsmouth, Nebr. 68048

[21] Appl. No.: 3,875

[22] Filed: Jan. 16, 1979

[51] Int. Cl.[2] ...................... B65G 43/08; B65G 47/64; B65G 47/57

[52] U.S. Cl. ...................................... 414/592; 92/137; 187/17; 198/467

[58] Field of Search ....................... 414/564, 592, 610; 187/17; 92/137; 198/467, 485

[56] References Cited

U.S. PATENT DOCUMENTS

| | | | |
|---|---|---|---|
| 1,849,385 | 3/1932 | Sekulski | 414/610 |
| 2,222,685 | 11/1940 | Raymond | 187/17 |

*Primary Examiner*—Robert G. Sheridan

*Attorney, Agent, or Firm*—Zarley, McKee, Thomte, Voorhees & Sease

[57] ABSTRACT

A vertical conveyor comprising an upstanding support including spaced-apart, horizontally spaced, vertically disposed side frame members. A platform for supporting the object to be conveyed is positioned between the frame members and is vertically movable thereon from a lowermost position to an uppermost position. A first elongated power cylinder is mounted on the support adjacent one of the frame members and is substantially vertically disposed. A piston is positioned within the first power cylinder and has cables secured thereto which extend outwardly from opposite ends of the cylinder. The cables are connected to the upper and lower portions of the platform so that downward movement of the piston in the first power cylinder will cause the platform to be vertically moved upwardly and so that upward movement of the piston in the first power cylinder will cause the platform to be vertically moved downwardly. A first limit switch is mounted on the support and is engaged by the object when the object has been placed on the platform while the platform is in its lowermost position. Actuation of the first limit switch causes the first power cylinder to be actuated so that the platform is raised from the said lowermost position to the said uppermost position. A horizontally disposed second power cylinder is mounted on the support adjacent the upper end thereof and has a push-off rod movably mounted therein which is movable from a retracted position to an extended position. The push-off rod pushes the object on the platform onto a discharge conveyor when the platform has been raised to its uppermost position. A second limit switch is mounted on the support and is closed when the platform reaches its uppermost position to actuate the second power cylinder so that the object is pushed from the platform onto the discharge conveyor. A third limit switch is positioned on the discharge conveyor and is closed by the object as the object passes thereover so that the push-off rod of the second power cylinder is retracted. The object then engages a fourth limit switch which causes the first power cylinder to be reversed so that the platform is lowered to its lowermost position so as to be able to receive another object thereon for the next cycle.

5 Claims, 6 Drawing Figures

VERTICAL CONVEYOR

BACKGROUND OF THE INVENTION

This invention relates to a vertical conveyor and more specifically to a vertical conveyor which is operated by pneumatic cylinders.

Vertical conveyors are frequently used in manufacturing facilities to raise objects between in-feed and discharge conveyors located on different levels. The in-feed conveyor may either be positioned above or below the discharge conveyor but the usual arrangement is that the in-feed conveyor is positioned below the discharge conveyor.

One type of vertical conveyor found in some manufacturing facilities is the Model 230 series conveyor manufactured by H. G. Weber & Co., Inc. of Kiel, Wisconsin. Although the Weber vertical conveyors have apparently met with some success, the conveyors are very expensive and are somewhat difficult to maintain. A further disadvantage in some of the vertical conveyors is that the conveyors are not easily adjusted so as to compensate for various conveying heights or various object sizes.

Therefore, it is a principal object of the invention to provide an improved vertical conveyor.

A further object of the invention is to provide a vertical conveyor which is simple to manufacture, erect and maintain.

A still further object of the invention is to provide a vertical conveyor which is economical of manufacture.

A still further object of the invention is to provide a vertical conveyor that may be easily adjusted to compensate for different heights between in-feed and discharge conveyors.

A further object of the invention is to provide a vertical conveyor which is easily cleaned and which permits the area around the conveyor to be easily cleaned.

A still further object of the invention is to provide a vertical conveyor which is durable in use.

SUMMARY OF THE INVENTION

Figure 1:
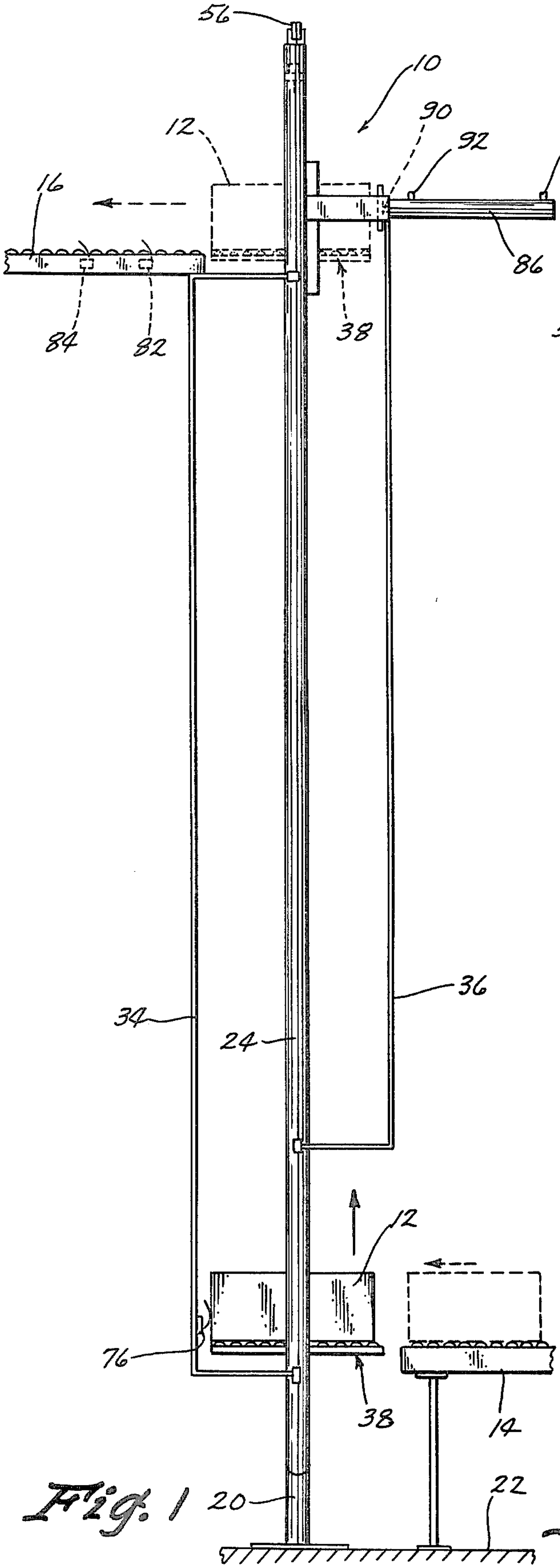
FIG. 1 is a side view of the vertical conveyor of this invention together with in-feed and discharge conveyors positioned adjacent thereto.

A vertical conveyor has been described which is adapted to raise objects or products from an in-feed conveyor to a discharge conveyor positioned thereabove. An upstanding support is provided including a pair of vertically disposed support members. An object platform is vertically movable on the support members from a lowermost position adjacent the in-feed conveyor to an uppermost position adjacent the discharge conveyor. An elongated first power cylinder is mounted on the support adjacent one of the support members and has a pair of cables secured to the piston thereof which extend from opposite ends of the cylinder for connection to the platform so that downward movement of the piston within the first power cylinder will cause the platform to be raised and vice versa. A push-off cylinder is mounted on the support adjacent the upper end thereof and is designed to push the object from the platform, when the platform is in its uppermost position, so that the object is moved onto the discharge conveyor. Control means is provided for sequentially: (1) activating the first power cylinder upon the object being received on the platform so that the platform is moved from its lowermost position to its uppermost position; (2) activating the push-off cylinder so that the object is moved from the platform onto the discharge conveyor; (3) retracting the push-off cylinder; and (4) lowering the platform from its uppermost position to its lowermost position so that another object may be received thereon.

DESCRIPTION OF THE PREFERRED EMBODIMENT

The vertical conveyor of this invention is referred to generally by the reference number 10 and is designed to convey object 12 from a conveyor 14 to a conveyor 16 which is positioned thereabove. It should be noted that the vertical conveyor 10 could also be used for conveying objects from the conveyor 16 to the conveyor 14 with slight revisions in the sensing switches, etc.

Conveyor 10 generally comprises a vertically disposed frame means 18 supported by a single pedestal 20 which is mounted on a suitable supporting surface such as a floor 22. The single pedestal 20 enables the floor area around the conveyor to be easily cleaned which is extremely important in food handling environments.

Frame means 18 includes a pair of horizontally spaced and vertically disposed frame members 24 and 26 which extend upwardly from a horizontally disposed frame member 28 mounted on the pedestal 20. Frame members 24 and 26 have guide plates 30 and 32 welded to the inside surfaces thereof respectively which extend along substantially the entire length of the frame members 24 and 26. The numerals 34 and 36 refer to guards positioned rearwardly and forwardly of the frame means to prevent the objects from inadvertently falling from the vertically movable platform 38.

Figure 2:
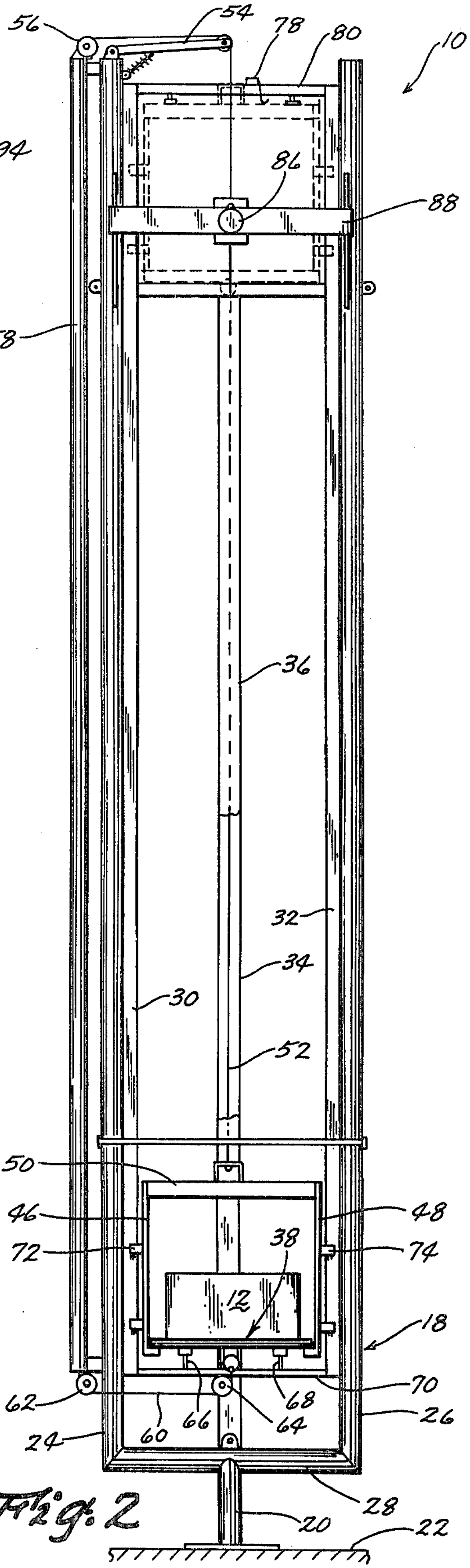
FIG. 2 is a front view of the conveyor of FIG. 1 with the broken lines illustrating the position of the object platform at its uppermost position.
Figure 3:
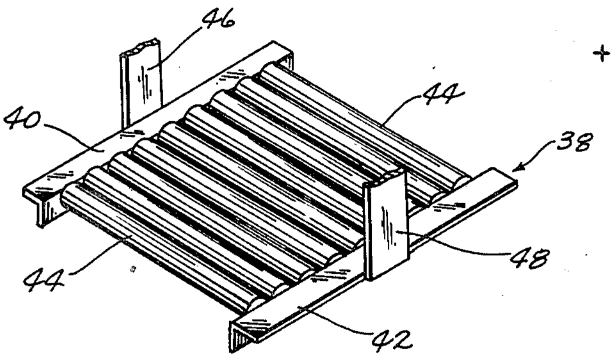
FIG. 3 is a partial perspective view of the object platform.

Platform 38 comprises a pair of spaced-apart angle members 40 and 42 having a plurality of rollers 44 secured thereto and extending therebetween. Arms 46 and 48 are secured to angles 40 and 42 and extend upwardly therefrom as best illustrated in FIG. 2. A transversely extending member 50 is secured to the upper ends of the arms 46 and 48 and extends therebetween. Flexible cable 52 is secured to member 50 by any cnvenient means and extends upwardly therefrom. As seen in FIG. 2, cable 52 extends over a tensioning assembly 54 and thence over pulley 56. Cable 52 then extends downwardly into a pneumatic cylinder referred to generally by the reference numeral 58. Cylinder 58 is of conventional design and is of the double-acting type with a piston 59 movably mounted in the interior thereof. Cylinder 58 is provided with ports at its upper and lower ends. One end of cable 52 is connected to the upper end of a piston within the cylinder 58. The upper end of cylinder 58 is provided with a suitable sealing means through which the cable 52 passes. A second cable 60 is secured to the lower end of the piston in cylinder 58 and extends downwardly therefrom through the sealing means at the lower end of cylinder 58, thence around pulleys 62 and 64. Cable 60 is connected to the underside of platform 38 by an convenient means. As seen in FIG. 2, stops 66 and 68 extend upwardly from support 70 to limit the downward movement of the platform 38. As also seen in FIG. 2, arms 46 and 48 are provided with guide followers 72 and 74 extending therefrom respectively which engage the members 30 and 32 respectively to guide the platform 38 as it vertically moves.

As best seen in FIG. 1, a limit switch 76 is mounted on guide 34 and is opened by the object 12 being positioned on the platform 38 as it moves from the conveyor 14. Limit switch 76 is a normally closed, three-way spring return valve with a mechanical actuator. Limit switch 78 is positioned on brace 80 which extends between the upper end of plates 30 and 32 and is opened by the member 50 when the platform 38 reaches its uppermost position. Limit switch 78 is a normally closed, three-way spring return valve with a mechanical actuator. Limit switches 82 and 84 are mounted on conveyor 16 and are adapted to be sequentially engaged by the object 12 as the object 12 moves onto and along the conveyor 16. Limit switch 82 is a normally closed, three-way spring return valve with a mechanical actuator. Limit switch 84 is a normally open, three-way spring return valve with a mechanical actuator.

The numeral 86 refers to a pneumatic push-off cylinder which is mounted at the upper end of the support by means of support assembly 88 secured to the frame members 24 and 26. Cylinder 86 is of the double-acting type and has a push-off rod 90 extending therefrom which is adapted to engage the object 12 when the platform 38 is in its uppermost position. Extension of the rod 90 from cylinder 86 causes the object 12 to be moved from the platform 38 onto the conveyor 16 as illustrated by the broken lines in FIG. 1. Cylinder 86 is provided with ports 92 and 94 at its opposite ends.

Figure 5:
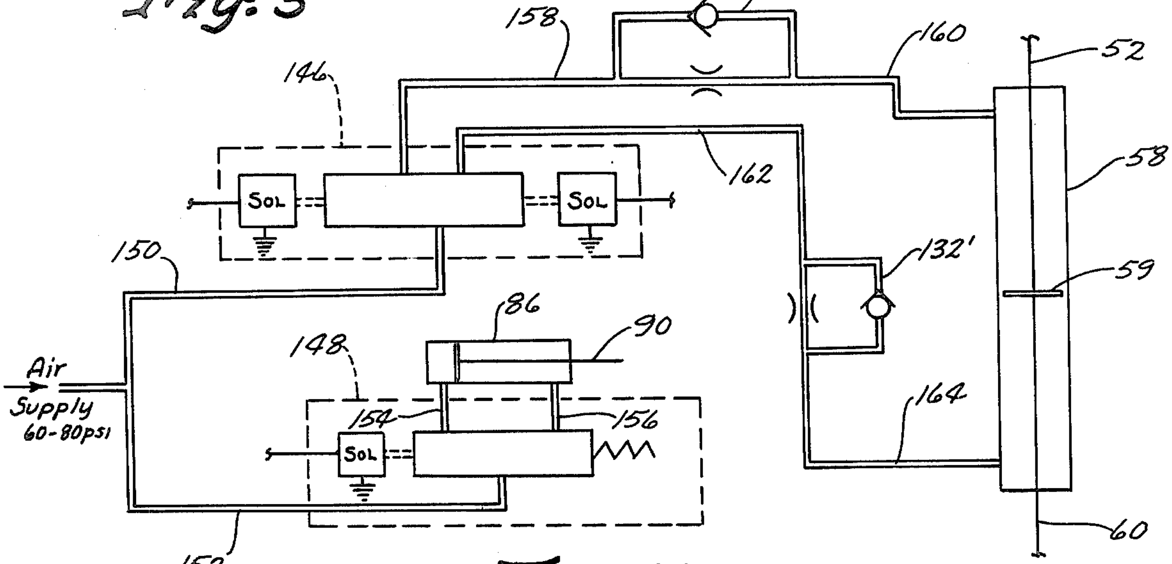
FIG. 5 is a schematic view illustrating the pneumatic circuitry when electrical controls are employed.
Figure 6:
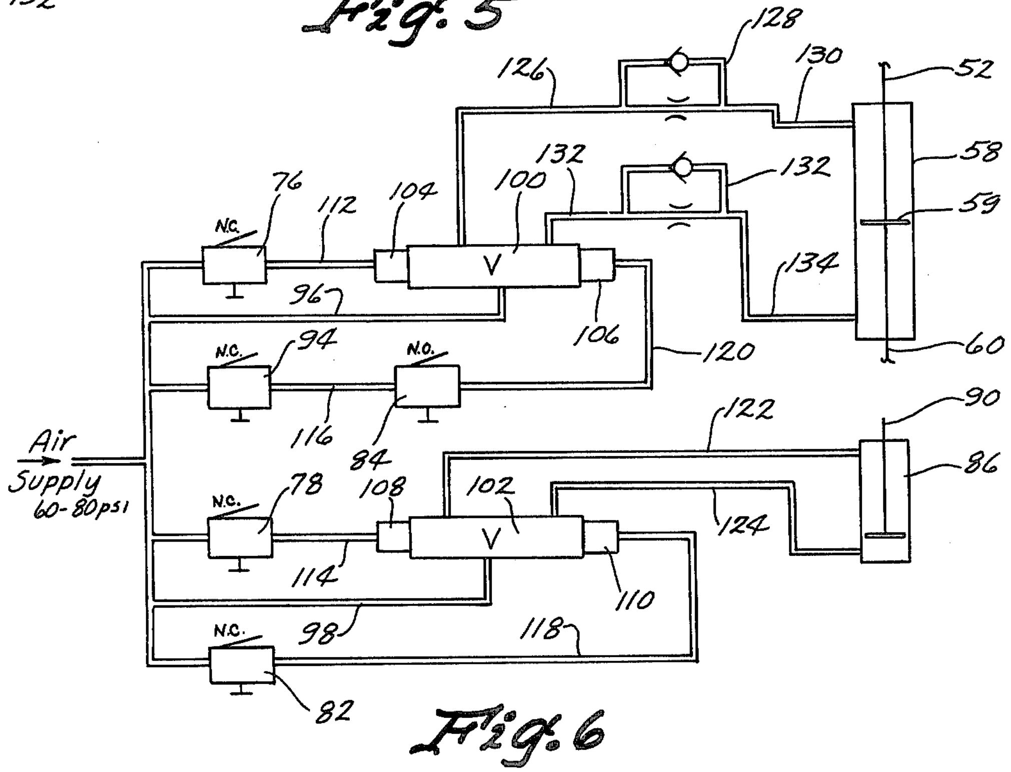
FIG. 6 is a schematic view illustrating the pneumatic circuitry when pneumatic controls are employed.

FIG. 6 is a schematic view of the pneumatic circuitry associated with the vertical conveyor of this invention when the pneumatic cylinders 58 and 86 are pneumatically controlled. FIG. 5 is a schematic view of the circuitry associated with the vertical conveyor when the pneumatic cylinders 58 and 86 are electrically controlled.

Referring to FIG. 6, the numeral 92 refers to a source of air under pressure which is connected to the valves 76, 78, 82, 84 and 94 as illustrated in FIG. 6. Valve 94 is a normally closed, three-way spring return valve with a mechanical actuator which is positioned adjacent the cylinder 86 so that it will be actuated when the push-off rod 90 is completely retracted. The source of air 92 is also connected by lines 96 and 98 to valves 100 and 102 respectively. Valve 100 is provided with resettable air pilot operators 104 and 106 while valve 102 is provided with resettable air pilot operators 108 and 110. Valve 100 is a four-way, normally closed pilot-operated, shifted position, detented air valve while valve 102 is a four-way, normally open pilot-operated, shifted position, detented air valve. Operator 104 is connected to valve 76 by line 112 while operator 108 is connected to valve 78 by line 114. Valves 94 and 84 are connected by line 116. Valve 82 is connected to operator 110 by line 118 while valve 84 is connected to operator 106 by line 120. Lines 122 and 124 are connected to valve 102 and to the cylinder 86 as illustrated in FIG. 6. Line 126 connects valve 100 to flow control valve 128 which is connected to the upper end of cylinder 58 by line 130. Line 132 connects valve 100 with flow control valve 132 which is connected to the lower end of cylinder 58 by line 134.

The operating sequence of the vertical conveyor described hereinabove is as follows. The platform 38 is initially in the lowermost position illustrated in FIGS. 1 and 2. The object 12 passes from the conveyor 14 onto the platform 38 and engages the mechanical actuator of the valve 76 thereby opening valve 76 so that pressure is supplied to operator 104 to shift valve 100 thereby supplying pressure to cylinder 58 through the line 126, valve 128 and line 130. The pressure supplied to cylinder 58 causes the piston 59 therein to be moved downwardly which causes the cable 52 to pull the platform 38 from its lowermost position illustrated by solid lines in FIG. 1 to the uppermost position illustrated by broken lines in FIG. 1. As the platform 38 reaches its uppermost position, the platform 38 engages the mechanical actuator of valve 78 thereby opening valve 78 to pressurize operator 108 which shifts valve 102 thereby causing the extension of push-off rod 90 from cylinder 86. Extension of the rod 90 causes the object 12 to be moved from the platform 38 onto the conveyor 16 as illustrated by the broken lines in FIG. 1. The object moving onto the conveyor 16 first engages the mechanical actuator of valve 82 to open the same thereby pressurizing operator 110 which shifts valve 102. The shifting of valve 102 causes the rod 90 to be retracted within cylinder 86 and to engage the mechanical actuator of the valve 94 to open the same. As the object was pushed from the platform 38, it engaged the mechanical actuator of valve 84 thereby closing the same. As soon as the object clears valve 84, valve 84 opens creating an open path through valve 84 and valve 94 which causes operator 106 to shift valve 100 to reverse cylinder 58. Reversal of the cylinder 58 causes the piston 59 to be moved upwardly in the cylinder so that the platform 38 is lowered from its uppermost position to its lowermost position to enable another object 12 to be received thereby.

The circuitry described hereinabove is extremely simple and reliable and prevents damage to the equipment. The circuitry just described insures that the platform 38 will not be lowered from its uppermost position until the push-off rod 90 has been completely retracted. The circuitry also insures that the platform 38 will not be raised from its lowermost position to its uppermost position unless the rod 90 is in its retracted position.

Figure 4:
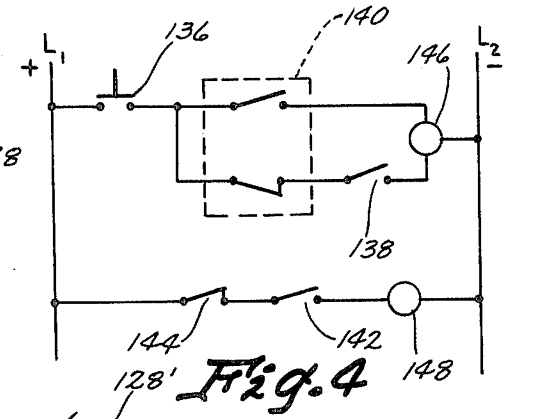
FIG. 4 is a schematic view of electrical circuitry when the conveyor cylinders are electrically controlled.

Although the pneumatic controls for the vertical conveyor are preferred, the cylinders 58 and 86 may also be controlled or operated by means of electrical controls. The electrical controls for the vertical conveyor are illustrated in FIGS. 4 and 5. Referring to FIG. 4, the numeral 136 refers to a manually operated switch while the leads L1 and L2 refer to leads connected to a source of 110 volt power. The numeral 138, 140, 142 and 144 refer to electrically controlled limit switches having actuators extending therefrom. The numerals 146 and 148 refer to solenoid valves. Valve 146 is a four-way, double solenoid, momentary contact with a maintained hold. Valve 148 is a four-way, single solenoid, spring return, maintained contact valve. As seen in FIG. 5, valve 146 is connected to a source of air under pressure by line 150 while valve 148 is connected to the source of air by line 152. Lines 154 and 156 connect the valve 148 with the cylinder 86 as illustrated. Valve 104 is connected to flow control valve 128' by line 58. Flow control valve 128' is connected to the upper end of cylinder 58 by line 160. Line 162 connects valve 146 to the flow control valve 132' which is connected to the lower end of the cylinder 58 by line 164.

When the electric controls of FIGS. 4 and 5 are employed, the operating sequence is as follows. Switch 136 is initially closed which supplies power to the circuit. As the object 12 hits the limit switch 138, the contacts thereof are closed thereby causing valve 146 to be switched to actuate cylinder 58. Platform 38 is lifted and engages limit switch 142 which energizes valve 148 to actuate cylinder 86. As cylinder 86 is extended, the object is pushed from the platform by the push-off rod. The object first engages limit switch 144 on the discharge conveyor which de-energizes the valve 148 and causes the rod 90 to cylinder 86 to be retracted. The object then engages the limit switch 140 which energizes the second solenoid in valve 146 to reverse cylinder 58. The sequence is finished or completed when the object clears limit switch 140 and closes an electrical circuit to limit switch 142. The conveyor is then ready for the next cycle.

Thus it can be seen that a novel vertical conveyor has been described which achieves at least all of the stated objectives.

I claim:

1. A vertical conveyor comprising, an upstanding support means having upper and lower ends, a platform means vertically movably mounted on said support means and movable between a lower first position and an upper second position, said platform means adapted to receive an object to be conveyed while positioned in its said first position, an elongated first power cylinder means positioned adjacent said support means, said first power cylinder means having a movable piston positioned therein, a first cable means secured to said piston and extending therefrom through the one end of said first power cylinder means and thence towards said platform means and being operatively connected to said platform means whereby movement of said piston in said first power cylinder means in one direction will cause said platform means to be raised towards its second position, a second cable means secured to said piston and extending therefrom through the other end of said first power cylinder means and thence towards said platform means and being operatively connected to said platform means whereby movement of said piston in said first power cylinder means in a second direction will cause said platform means to be lowered towards its first position, a second power cylinder means on said support means adjacent the upper end thereof and having a push-off rod movably extending from a cylinder body, said push-off rod normally being in a retracted position but being movable to an extended position for engagement with the object on the platform means, when said platform means is in its said second position, to push the said object from said platform means, power means supplying power to said power cylinders, and control means operatively connected to said power means to initially move said platform means from its said first position to its said second position after the said object has been positioned thereon, thence extend said push-off rod to push the object from said platform means, thence retract said push-off rod, and thence lower said platform means to its said first position.

2. The conveyor of claim 1 wherein said first power cylinder means is disposed in a substantially vertical position closely adjacent said support means.

3. The conveyor of claim 2 wherein said support means has a single pedestal at its lower end which supports said support means.

4. A vertical conveyor comprising, an upstanding support means comprising a pair of horizontally spaced and vertically disposed support members having upper and lower ends, a platform means between said support members and vertically movably mounted thereon between a lower first position and an upper second position, said platform means adapted to receive the object to be conveyed while positioned in its said first position, an elongated first power cylinder positioned adjacent one of said support members disposed in a substantially parallel position to said one support member, said first cylinder having a piston positioned therein, a first cable means secured to said piston and extending upwardly therefrom through the upper end of said first cylinder and thence towards said platform means and being operatively connected to said platform means whereby downward movement of said piston in said first cylinder will cause said platform means to be raised towards its second position, a second cable means secured to said piston and extending downwardly therefrom through the lower end of said first cylinder and thence towards said platform means and being operatively connected to said platform means whereby upward movement of said piston in said first cylinder will cause said platform means to be lowered towards its first position, a second power cylinder on said support means adjacent the upper end thereof and having a push-off rod movably extending from a cylinder body, said push-off rod normally being in a retracted position but being movable to an extended position for engagement with the object on the platform means, when said platform means is in its second position, to push the said object from said platform means, power means supplying power to said power cylinders, and control means operatively connected to said power means to initially move said platform means from its said first position to its said second position after the said object has been positioned thereon, thence extend said push-off rod to push the object from said platform means, thence retract said push-off rod, and thence lower said platform means to its said first position.

5. The conveyor of claim 4 wherein an in-feed conveyor is positioned adjacent said support means for depositing the said object onto said platform means; a discharge conveyor positioned adjacent said support means for receiving the said object on said platform when said object is pushed from said platform means; said control means comprising first sensing means which is actuated when said object is supplied to said platform means, a second sensing means which is actuated when said platform means reaches its said second position, a third sensing means positioned on said discharge conveyor which is actuated when said object passes onto said discharge conveyor; said first, second and third sensing means being sequentially actuated to: (1) cause said platform means, through said first power cylinder means, to be raised from its first position to its second position after the object has been received thereon; (2) cause said second power cylinder means to be actuated to push the object from said platform means onto said discharge conveyor; (3) retract said second power cylinder means; (4) and lower said platform means from its second position to its first position.

* * * * *